US005802547A

United States Patent [19]
Legvold

[11] Patent Number: 5,802,547
[45] Date of Patent: Sep. 1, 1998

[54] DATA STORAGE SYSTEM WITH STREAMLINED DATA EXCHANGE PATH TO CACHED DATA

[75] Inventor: Vernon John Legvold, Tucson, Ariz.

[73] Assignee: International Business Machines Corporation, Armonk, N.Y.

[21] Appl. No.: 729,899

[22] Filed: Oct. 15, 1996

[51] Int. Cl.⁶ .................... G06F 12/00; G06F 13/00
[52] U.S. Cl. .................. 711/100; 711/3; 711/4; 711/111; 711/112; 711/154; 371/40.1; 395/845
[58] Field of Search .................. 711/4, 3, 111, 711/112, 100, 154, 147; 371/40.1; 395/845

[56] References Cited

U.S. PATENT DOCUMENTS

| | | | |
|---|---|---|---|
| 5,148,537 | 9/1992 | Belsan | 711/11 |
| 5,155,678 | 10/1992 | Fukumoto et al. | 395/425 |
| 5,224,215 | 6/1993 | Disbrow | 395/250 |
| 5,280,612 | 1/1994 | Lorie et al. | 395/600 |
| 5,379,398 | 1/1995 | Cohn et al. | 395/425 |
| 5,381,528 | 1/1995 | Brunelle | 711/103 |
| 5,390,327 | 2/1995 | Lubbers et al. | 395/575 |
| 5,408,629 | 4/1995 | Tsuchiya et al. | 395/425 |
| 5,457,791 | 10/1995 | Matsumoto et al. | 395/182.03 |
| 5,459,853 | 10/1995 | Best et al. | 395/441 |
| 5,463,754 | 10/1995 | Beausoleil et al. | 395/200.08 |
| 5,477,552 | 12/1995 | Nishiyama | 371/40.1 |
| 5,493,724 | 2/1996 | Cohn et al. | 395/858 |
| 5,539,914 | 7/1996 | Fry et al. | 395/827 |
| 5,553,307 | 9/1996 | Fujii et al. | 395/845 |
| 5,555,390 | 9/1996 | Judd et al. | 711/112 |
| 5,588,012 | 12/1996 | Oizumi | 371/51.1 |
| 5,603,001 | 2/1997 | Sukegawa et al. | 711/103 |
| 5,606,679 | 2/1997 | Cohn et al. | 711/4 |

OTHER PUBLICATIONS

D. Hicks et al., "Complete Directory for System Memory in Multiprocessor Systems", *IBM Technical Disclosure Bulletin*, vol. 38, No. 08, Aug. 1995, pp. 577–578.

M. R. Funk et al., "Cache Optimized Structure Supporting Global Object Locks", *IBM Technical Disclosure Bulletin*, vol. 37, No. 06B, Jun. 1994, pp. 11–17.

Y. Mathys et al., "Tracking Design Methodology in DAMOCLES", Inspec Abstract No. 4885145, 1995.

"Concurrent Framework Processing Appts. for Application Users", Abstract from WO Patent No. 9419751, Sep. 1, 1994.

*Primary Examiner*—Tod R. Swann
*Assistant Examiner*—Tuan V. Thai
*Attorney, Agent, or Firm*—Baker Maxham Jester & Meador

[57] ABSTRACT

A data storage system establishes streamlined data exchange paths between stored data and multiple system hosts, decreasing contention among the hosts and expediting host access to the data. First, one or more storage directors receive an initial host request to access a data block contained in part of a shared data resource. This part of the shared data resource may comprise a magnetic disk drive device, part of a physical device, a logical volume, a logical device or another data group. In response, the storage director performs a predetermined series of initial access steps to facilitate the data transfer. For example, the data block is copied from the shared data resource into a cache, if not already present therein. Then, a data path is formed between the host and the device containing the data block. Next, a fast path map is updated to indicate establishment of the data path between the host and the device containing the data block. The data block is subsequently exchanged between the cache and the host. When the storage director receives a subsequent request by the same host to access the same device, the storage director consults the fast path map and determines that a data path already exists between the host and the device. Accordingly, the requested data is exchanged between the host and the cache utilizing the previously established data path between the host and the device, avoiding many steps initially required to establish the data path.

53 Claims, 3 Drawing Sheets

5,802,547

DATA STORAGE SYSTEM WITH STREAMLINED DATA EXCHANGE PATH TO CACHED DATA

BACKGROUND OF THE INVENTION

1. Field of the Invention

The present invention concerns multi-host data storage systems. More particularly, the invention concerns a data storage system that establishes streamlined data exchange paths between stored data and multiple system hosts, decreasing contention among the hosts and expediting each host's access to the data.

2. Description of the Related Art

One of the most difficult duties of a data storage system is efficiently providing multiple hosts with access to stored data. Many systems ensure consistency of data by using data locking. For instance, the first host obtaining access to that data may receive a lock on the resource containing the data, excluding access to that resource by other hosts until the operation is complete.

Under this approach, one problem is the "thrashing" that can occur when multiple hosts learn that a data resource is free, and each host configures an I/O channel for an upcoming data access, but the data resource is locked when the first host first begins to access the data. As a result, the channel I/O resources have wasted time in attempting to establish the ultimately unsuccessful access.

The above problems are compounded in environments where data resources are shared by a substantial number of hosts. One example is a company's common airline reservation data shared by reservation agents across the world. In systems such as these, storage engineers are constantly striving to improve the quickness with which hosts gain access to shared data resources in a multi-host data storage system.

SUMMARY OF THE INVENTION

Broadly, the present invention concerns a data storage system that establishes streamlined data exchange paths between stored data and multiple system hosts, expediting each host's access to the data and thereby decreasing contention among the hosts.

In one embodiment, the invention may be implemented to provide a method to establish streamlined data exchange paths between a storage device in a shared data resource and multiple system hosts. First, one or more storage directors receive an initial request by one of the multiple hosts to access a data block contained in the storage device. In response to the initial request, the storage director performs a predetermined series of initial access steps to facilitate the data transfer. For example, the storage director copies the data block into a cache, if not already present therein. The storage director also establishes a data path between the host and the data block in the storage device. Then, a fast path map is updated to indicate establishment of the data path between the host and the storage device containing the data block. Next, the data block is exchanged between the cache and the host, and the operation is complete.

Later, the storage director receives another request by the same host to access data in the same storage device. First, the storage director consults the fast path map and determines that the data path has been established between the host and the storage device. Having already established a data path between the device and the host, this data exchange operation can therefore be accelerated. In particular, the requested data is exchanged between the host and the cache, in accordance with the subsequent request, utilizing the data path between the host and the device. Many steps initially required to establish the data path between the device and the host can therefore be avoided.

In another embodiment, the invention may be implemented to provide an article of manufacture in the form of a data storage device, tangibly embodying a program of machine-readable instructions to establish streamlined data exchange paths between a shared data resource and multiple system hosts. In another embodiment, the invention may be implemented to provide an apparatus, including at least one storage director interposed between multiple hosts and a shared data storage resource, where the storage director includes a cache, a shared control array, and a processor programmed to establish streamlined data exchange paths between the shared data storage resource and multiple system hosts.

The invention affords its users with a number of distinct advantages. First, after a host initially accesses data stored in a data storage device of the invention, subsequent accesses by that host to the device are expedited since the data path has already been established. This faster access therefore helps reduce stalls and other conflicts among hosts competing for access to data. Furthermore, the invention provides an expedited data path while still retaining full error processing and busy-data processing. The invention may also take advantage of highly granular data locks, to avoid thrashing and other contention problems between competing hosts.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Hardware Components & Interconnections

Overall System

Figure 1:
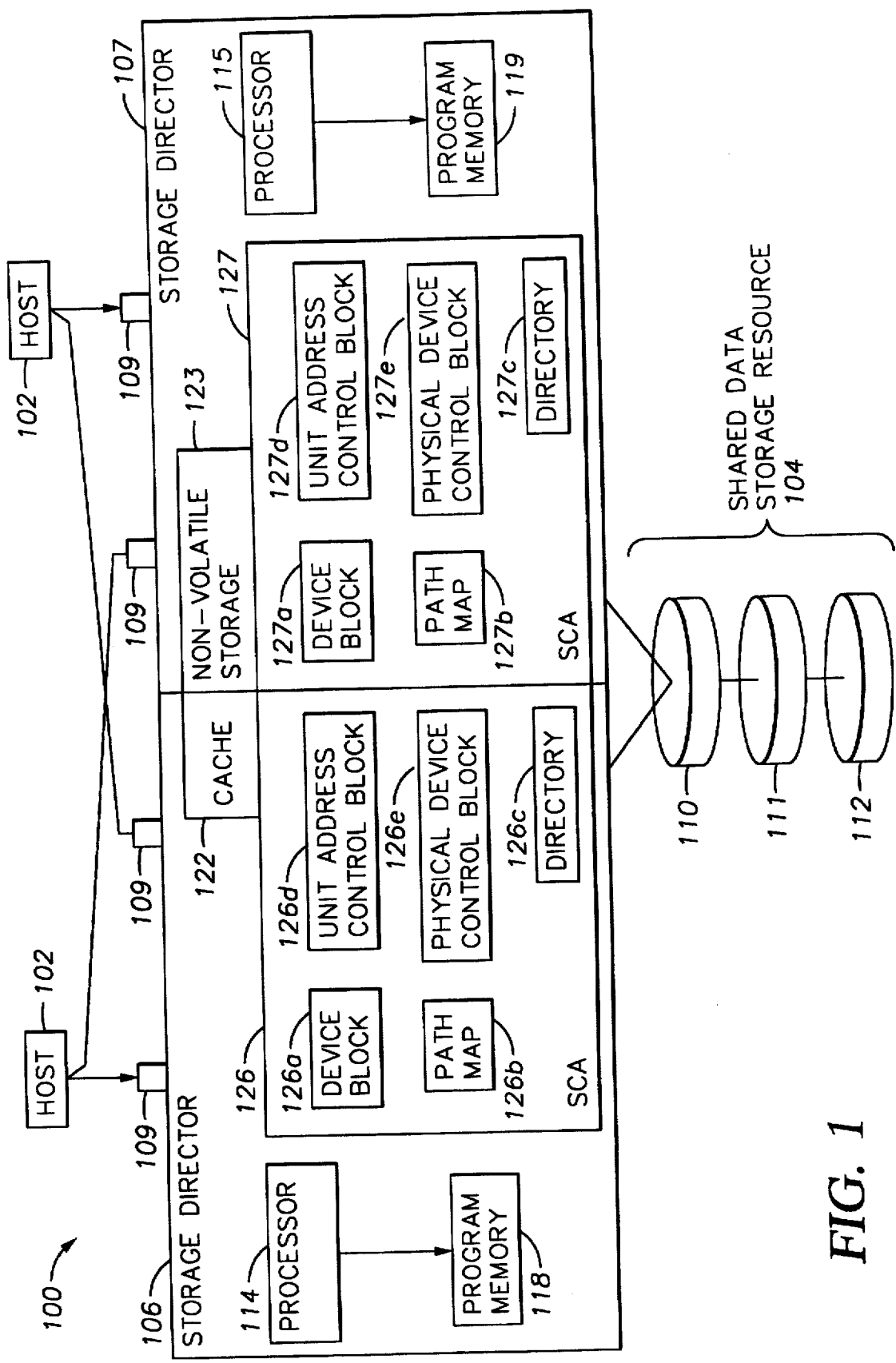
FIG. 1 is a diagram of the hardware components and interconnections of an illustrative data storage system of the invention.

One aspect of the invention concerns a data storage system 100, which may be embodied by various hardware components and interconnections as described in FIG. 1. The system 100 conducts data exchange operations between multiple hosts 102 and a shared data storage resource 104. In response to host requests to read and write data, storage directors 106–107 establish data paths between the hosts and devices 110–112 of the shared data storage resource 104. As an example, the system 100 may comprise an IBM model 3990-6 storage system.

Hosts

The hosts 102 comprise units requesting access to data in the shared data storage resource 104. The hosts 102 may comprise digital computing devices such as mainframe computers, personal computers, storage controllers, microprocessors, standalone user terminals, executing application programs, or other suitable host machines or processes. In an exemplary embodiment, the hosts 102 may comprise IBM model ES-9000 mainframe computers employed in an airline reservation system.

Each host 102 is coupled to all storage directors 106–107. As an example, this coupling may be made by respective communication channels 109 such as IBM ESCON directors, which provide 18 Mb/second communication channels.

Shared Data Storage Resource

The hosts 102 seek access to data contained in the shared data storage resource 104. Preferably, the resource 104 comprises a non-volatile storage device such as one or more magnetic data storage disk drive devices 110–112. However, other suitable types of nonvolatile storage device may be used, such as magnetic tape, optical tape, optical disk, etc. Furthermore, instead of comprising physical devices, the devices 110–112 may represent "logical devices" or "logical volumes", each being made up of one physical device, part of a physical device, or multiple physical devices.

Storage Director

The hosts 102 are coupled to the shared data storage resources 104 by one or more storage directors. In the illustrated example, two storage directors 106–107 are shown, providing the advantage of duplication, in case one storage director fails. Each storage director 106–107, as an example, may be embodied in an IBM model 3990-6 control unit, which contains two storage directors.

The storage directors 106–107 include a number of components. Depending upon the specific needs of the application, certain components may be embodied by known components of an IBM model 3990-6 control unit, for example.

Processor & Memory Unit

The storage directors 106–107 include processors 114–115 to manage operations of the storage directors. Each processor is coupled to a program memory 118–119, preferably comprising fast access memory such as RAM. The program memories 118–119 contain programming instructions executable by the processors 114–115 to conduct operations of the storage directors 106–107.

Cache/NVS

In addition to the program memories 118–119, the storage directors include a number of other data storage features. For instance, each storage director also includes a cache. Particularly, the storage director 106 includes a fast access cache memory 122 ("cache"), whereas the storage director 107 includes a non-volatile storage unit 123) ("NVS"). Preferably, the cache 122 comprises RAM, and the NVS 123 comprises RAM with a battery back-up (not shown). The NVS 123) is operated to mirror contents of the cache 122, providing redundancy in case the storage director 106 fails. In the interest of efficiency, the NVS 123 preferably mirrors only cache data that differs from data stored in the devices.

Shared Control Array ("SCA")

Another data storage feature of the storage directors 106–107 is provided by the shared control arrays 126–127 ("SCAs"). The SCAs 126–127 comprise data storage regions that maintain statistical data relating to the operation of the storage directors 106–107. Each storage director's SCA includes a number of different sub-components, which are mirrored in the SCA of the other storage director.

The SCA 126 includes a device block 126a, a fast path map 126b, a directory 126c, a unit address control block ("UACB") 126d, and a physical device control block ("PDCB") 127e. Similar components are also present in the SCA 127; a specific description of these components is not necessary in view of the following detailed description of the features of the SCA 126.

Device Block

The device block 126a indicates whether any one or more of the devices 110–112 is unavailable. Such unavailability may result from a number of reasons, such as device failure. If desired, the device block 126a may be incorporated into the UACB 126d.

Fast Path Map

The fast path map 126b contains one "indicator" for each possible matching of one host 102 and one device 110–112. Each indicator may, for example, comprise a binary indicator such as a bit of data; in this embodiment, the fast path map 126b comprises a bit map. The indicator shows whether a "fast path" has been established for each host-device combination. As discussed in greater detail below, the fast path provides a mode of expedited host-device data transfer.

In an exemplary embodiment, the fast path map 126b may contain one-hundred-twenty-eight bits for each of the devices 110–112, thereby facilitating matching of one-hundred-twenty-eight possible hosts to each of the devices 110–112.

Directory

The directory 126c lists all blocks of data from the devices 110–112 that are present in the cache 122. Each data block may comprise any convenient unit of data. For instance, if the devices 110–112 comprise magnetic storage disks, each data block may comprise a track of data. For each cached data block, the director 126c contains a flag indicating whether that data block is currently being used. The flag, for example, may comprise a binary digit that is set to zero when the data block is not being used, and set to one when the data block is being used.

UACB

The UACB 126d is a memory register that can be activated to lock logical parts of the shared data storage resource 104 during data exchange with one of the hosts 102. The UACB may employ the operating principles of known UACBs, such as those present in the IBM model 3990-6 control unit. As described in greater detail below, however, the present invention advantageously avoids the need to lock large parts of the data resource 104, thereby reducing thrashing and contention among the hosts 102 for data stored in the resource 104.

PDCB

The PDCB 126e is a memory register that can be activated to lock one of the physical devices 110–112 for various conditions, such as read miss, destage, and other operations. The PDCB, like the UACB, may be provided by known devices, such as the PDCB of the IBM model 3990-6 control unit.

Other Components

The SCAs 126–127 also include a number of other components (not shown), many of which may be embodied by components of known SCAs. Depending upon the needs of the application, the SCAs 126–127 may be embodied by known SCAs such as those used in the IBM model 3990-6 control unit. Further details required to implement the SCAs 126–127 are considered to be within the abilities of an ordinarily skilled artisan having the benefit of this disclosure and knowledge of the well established principles of operating shared memory such as the IBM model 3990-6.

OPERATION

In addition to the various hardware embodiments described above, a different aspect of the invention concerns a method for establishing streamlined data exchange paths between multiple system hosts and stored data, decreasing contention among the hosts and expediting each host's access to the data. Such a method may be implemented, for example, by operating the processors 114–115 to execute a sequence of machine-readable instructions.

Data Storage Media

These instructions may reside in various types of data storage media. In this respect, one aspect of the present invention concerns an article of manufacture, comprising a data storage medium tangibly embodying a program of machine-readable instructions executable by a digital data processor to perform method steps to establish streamlined data exchange paths between stored data and multiple system hosts, decreasing contention among the hosts and expediting each host's access to the data.

Figure 2:
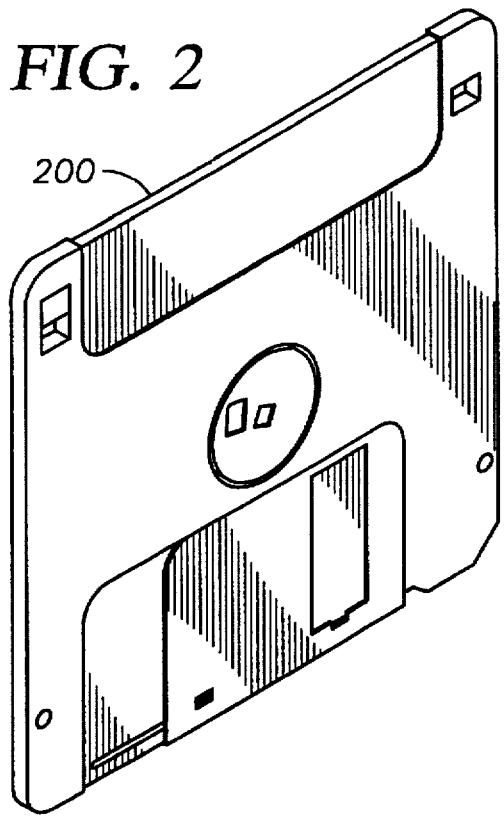
FIG. 2 is a perspective view of an illustrative article of manufacture embodied by a data storage device in accordance with the invention.

This data storage medium may comprise, for example, RAM contained within the storage directors 106–107, such as the program memories 118–119. Alternatively, the instructions may be contained in another data storage medium, such as a magnetic data storage diskette 200 (FIG. 2). Whether contained in the storage directors 106–107 or elsewhere, the instructions may instead be stored on another type of data storage medium such as DASD storage (e.g. a conventional "hard drive" or a RAID array), magnetic tape, electronic read-only memory (e.g. ROM), optical storage device (e.g. WORM), paper "punch" cards, or other data storage media. In an illustrative embodiment of the invention, the machine-readable instructions may comprise lines of compiled C language code.

Overall Sequence of Operation

Figure 3:
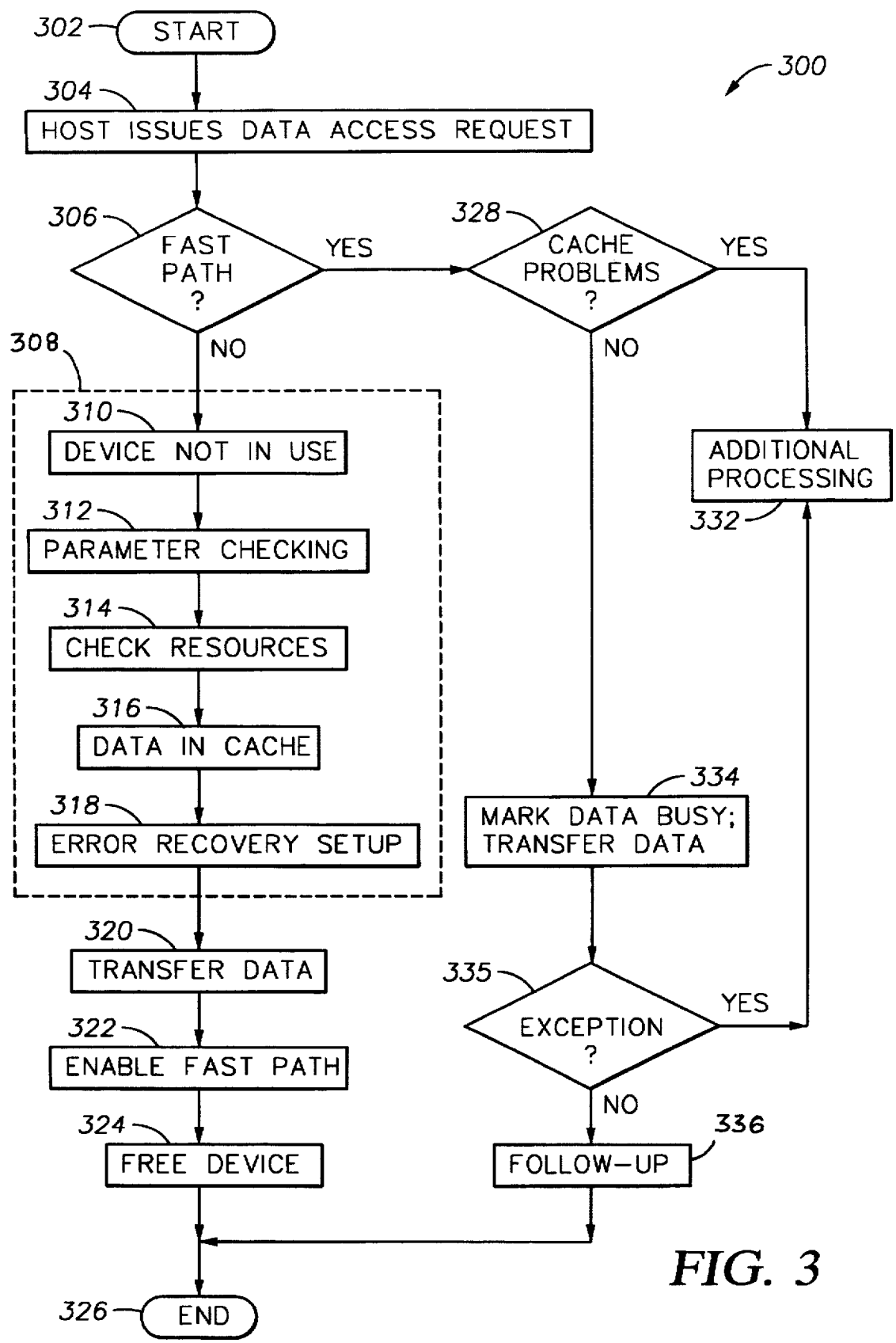
FIG. 3 is a flowchart showing a sequence for establishing a data exchange path in accordance with the invention.

FIG. 3 shows a sequence of method steps 300 to illustrate one example of the method aspect of the present invention. For ease of explanation, but without any limitation intended thereby, the sequence 300 is described in the context of the data storage system 100 described above. Since actions in the storage director 106 are reproduced in the storage director 107, the present discussion is limited to the director 106, for ease of illustration.

After the steps 300 are initiated in task 302, one of the hosts 102 in task 304 issues a data access request to the storage directors 106–107. This data access request seeks to exchange a data block with one of the devices 110–112. As part of task 304, the storage director 106 may identify an appropriate one of the devices 110–112 to perform the data transfer: the device 110–112 containing the data block in the case of a Read operation, or a device 110–112 with sufficient empty storage space in the case of a Write operation. Next, query 306 consults the fast path map 126b to determine whether the fast path mode has been established between the requesting host and the previously specified device 110–112. If so, the data may be exchanged using the fast path. Accordingly, query 306 proceeds to query 328, which is discussed in greater detail below. If the fast path mode has not been established for the relevant host-device combination, fast path data transfer is not available. Accordingly, query 306 proceeds to task 308 to use a main path for the data transfer, and in the process to establish a fast path for subsequent transfers.

Main Path

As mentioned above, task 308 establishes the main path for the requested data transfer. In establishing the main path, task 310 first determines whether the previously specified device 110–112 is in use. If so, the data access may be delayed, for example by performing a "channel wait", a known operation. If the device is not in use, the UACB 126d is configured to lock the device containing the requested data.

Next, a parameter checking step 312 is performed. This step checks various parameters associated with the data transfer request. For instance, this task determines whether certain hardware or software "exceptions" have occurred, such as sense record offloads, hardware failures, or other known exceptions. Task 312 may also involve conducting validity checking regarding the CCHH address, track location, and record number, and other aspects of the data exchange request. Next, in task 314, the storage director 106 checks the hardware resources, for example, to determine whether the cache 122 is operational, the specified device 110–112 is operational, the NVS 123 is in a ready state, etc.

After task 314, task 316 determines whether (in the case of a Read operation) the requested data block is present in the cache 122; if not, space in the cache 122 is allocated and the data is staged. Following task 316, task 318 prepares the system 100 for error recovery in case the upcoming data transfer encounters problems. This involves steps such as establishing retry counts, establishing retry routines, and other steps, some or all of which may be known.

Many of the foregoing steps 310–318 for establishing the main path may employ operations that are generally known in conjunction with the IBM model 3990-6 control unit. After the main path is established in task 308, task 320 conducts the actual data transfer. As discussed above, the UACB 126d has already been activated to lock the appropriate one of the devices 110–112 prior to the data transfer. After the data transfer of task 320, the UACB 126d is configured to unlock the device specified 110–112, enabling the other hosts 102 to once again access the device.

Next, task 322 enables the fast path by configuring the fast path map 126b. In particular, the appropriate fast path map indicator is set to establish a fast path between the requesting host and the specified device 110–112. In one embodiment of the invention, task 322 may automatically enable all paths between the requesting host 102 and the device 110–112, if multiple paths exist from that host to the specified device.

After task 322, the device used in the transfer is freed by relinquishing the UACB 126d for that device. Then, the program ends in task 326.

Fast Path

There are certain advantages to performing data exchanges when a fast path has been established. Chiefly, less time is required to re-establish the data path, and the data exchange is therefore accomplished more quickly. As mentioned above, the fast path steps begin when query 306 finds that the fast path has been established. Furthermore, advantages of the main path are still available if needed, such as error recovery and other benefits as discussed below.

After query 306 recognizes that the fast path has been established between host and device, query 328 determines whether the data transfer operation can be completed without any cache problems. Some of these problems include, for example, (1) the requested data being missing from the cache 122 (in the case of a Read operation), (2) the requested data block being used by another host. If such an error exists, additional processing steps 332 are performed, as discussed in greater detail below.

If no cache errors exist, the requested data block is temporarily flagged as being "busy" in the directory 126c in task 334. This effectively locks the data block for exclusive access by the requesting host. However, due to the highly granular nature of this lock, it is unlikely to impede data access requests of other hosts. After marking the data block "busy", the requested data transfer operation is executed in task 334. After task 334, query 335 determines whether any exceptions occurred during the data transfer. If such an error exists, additional processing steps are performed in task 332, as discussed above. If no exception has occurred, however, then certain follow-up steps are performed in task 336. Namely, the "busy" flag is cleared in the directory 126c. Furthermore, some or all of the parameter checking tasks of step 312 may be performed. Some of these steps, for example, may include verifying cache fastwrite IDs, record numbers, and other known parameters. After task 336, the routine 300 ends in task 326.

Error and Busy-Data Processing

Figure 4:
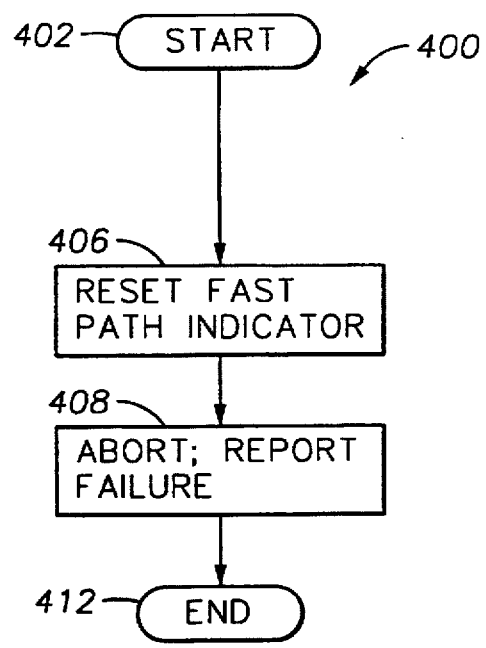
FIGS. 4–6 are flowcharts showing sequences for additional processing in accordance with the present invention.
Figure 5:
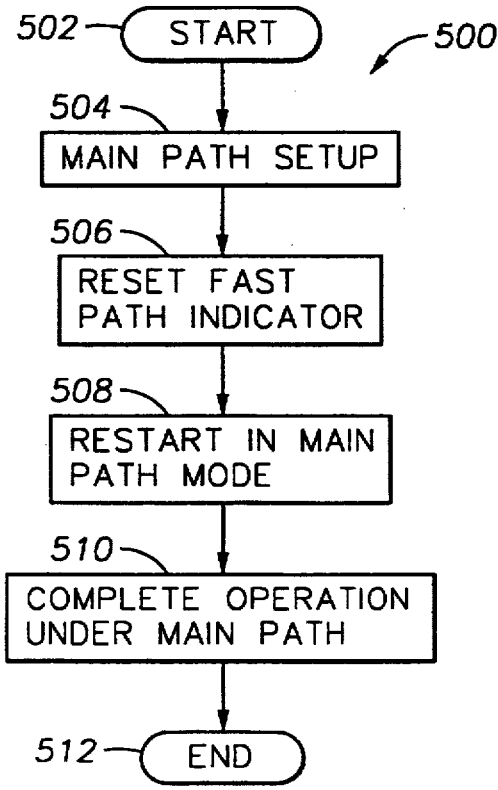
Figure 6:
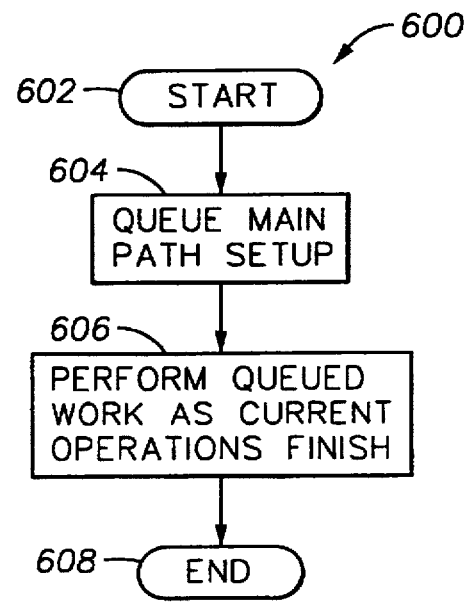

As discussed above, events such as cache error and busy-data conditions are processed in task 332 (FIG. 3). FIGS. 4–6 illustrate different routines 400, 500, and 600 to illustrate the operation of task 332 in greater detail. For ease of explanation, but without any limitation intended thereby, the sequences 400, 500, and 600 are described in the context of the data storage system 100 described above.

First Example

After the sequence 400 is initiated in task 402, the fast path indicator 126b is reset in task 406, removing fast path status for the path between the requesting host 102 and the requested device 110–112. After task 406, task 408 issues an abort operation, and reports the failure to the requesting host. After task 406, the routine 400 ends in task 412.

When the host retries (not shown) the aborted operation at some later time, the main path will be used, since the fast path indicator 126b has been disabled for the current host-device path using the main path, although slower, provides many advantages for some operations, such as employing the full scope of retry capabilities of the storage director 106.

Second Example

FIG. 5 depicts another example of an error/read-miss recovery sequence 500 according to the invention. After the steps 500 are initiated in task 502, task 504 establishes a main path for the requested data transfer. The main path is established by performing step 308 (FIG. 3), as discussed above. After task 504, the fast path indicator 126b is reset in task 506, removing fast path status for the path between the requesting host 102 and the requested device 110–112.

After task 506, task 508 restarts the storage director 106 in main path mode. In task 510, the data transfer is completed using the main path mode. After task 510, the routine 500 ends in task 512.

Third Example

FIG. 6 depicts another example of an error/read-miss recovery sequence 600 according to the invention. After the steps 600 are initiated in task 602, task 604 queues the steps needed to establish the main path (e.g., steps 310–318, FIG. 3) and the steps required to transfer the data under main path mode. The storage director 106 sequentially processes the queued items, along with other tasks. When the storage director 106 completes all operations of higher priority, the queued work is executed, as shown in task 606. As discussed above, this queued work includes (1) configuring the main path between the requesting host 102 and the requested device 110–112, and (2) transferring the requested data under the main path. After task 606, the sequence 600 ends in task 608.

Selective Path Deactivation

One advantage of the data storage system 100 is that certain data paths may be selectively deactivated in accordance with errors that occur in the system 100. For instance, if a global resource such as the cache 122 fails, all host-cache fast paths may be easily deactivated by configuring the fast path map 126b accordingly. Similarly, if a particular device 110–112 fails or goes off-line, all paths to/from that device may be deactivated using the fast path map 126b. Other possibilities, for example, include deactivating all fast paths to/from a particular host 102, or deactivating a particular host-device path.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. A method for facilitating streamlined data transfer operations in a data storage system having a shared data resource accessible by multiple hosts, said subsystem additionally having a cache coupled to the hosts and the shared data resource, the method comprising the steps of:

receiving a request by a first one of the multiple hosts to exchange a first data block with the shared data resource, said request including specification of a number of data transfer parameters, said first data block residing in a first part of the shared data resource;

in response to the request, consulting a fast path map to determine whether a first data path has been established between the first host and the first part;

if the first data path has not been established, performing first path setup-transfer steps comprising:

establishing the first data path between the first host and the first part by performing steps comprising:

performing a parameter checking step including verifying validity of the data transfer parameters;

performing a resource checking step including verifying that the cache and the first part are operational;

if the request constitutes a request to read the first data block from the shared data resource, determining whether the first data block is present in the cache, and if not present copying the first data block into the cache;

performing an error recovery setup step including configuring the data storage system for recovery of any errors occurring during exchange of the first data block;

updating the fast path map to indicate establishment of the first data path between the first host and the first part; and transferring the first data block between the cache and the first host while locking at least the first part of the shared data resource;

if the first data path has already been established, performing accelerated access steps comprising:

utilizing the previously established first data path and the previously performed parameter verifying, resource verifying, and error recovery steps;

transferring the first data block by performing steps comprising:

if the request constitutes a request to read the first data block from the shared data resource, determining whether the first data block is present in the cache, and if so, transferring the first data block from the cache to the first host utilizing the first data path between the first host and the cache while leaving the shared data resource in an unlocked condition;

if the request constitutes a request to write the first data block from the first host to the shared data resource, transferring the first data block from the first host to the cache utilizing the first data path between the first host and the cache while leaving the shared data resource in an unlocked condition; and during transferring of the first data block marking in a directory an entry corresponding to the first data block to prevent access of the first data block by other hosts.

2. The method of claim 1, wherein the data block is a track of data.

3. The method of claim 1, wherein the data block comprises multiple tracks of data.

4. The method of claim 1, further comprising the steps of:

during transferring of the first data block, locking the first data block to limit access to the first data block exclusively to the first host.

5. The method of claim 4, the locking step comprising designating the first data block as being busy in a directory.

6. The method of claim 1, the accelerated access steps further comprising the following steps, performed if the request constitutes a request to read the first data block from the shared data resource and the first data block is not present in the cache:

updating the fast path map to indicate absence of the first data path between the first host and the cache; and issuing an abort command and reporting failure of the data transfer operation to the first host.

7. The method of claim 1, the accelerated access steps further comprising the following steps, performed if the request constitutes a request to read the first data block from the shared data resource, and the first data block is not present in the cache:

updating the fast path map to indicate no establishment of the first data path between the first host and the cache; and performing the first path setup-transfer steps.

8. The method of claim 1, the accelerated access steps further comprising the following steps, performed if the request constitutes a request to read the first data block from the shared data resource but the first data block in the cache is presently being accessed by a different host:

updating the fast path map to indicate absence of the first data path between the first host and the cache; and issuing an abort command and reporting failure of the data transfer operation to the first host.

9. The method of claim 1, the accelerated access steps further comprising the following steps, performed if the request constitutes a request to read the first data block from the shared data resource but the first data block in the cache is presently being accessed by a different host:

updating the fast path map to indicate no establishment of the first data path between the first host and the cache; and performing the first path setup-transfer steps.

10. The method of claim 1, the first part being a logical subcomponent of the shared data resource.

11. The method of claim 1, the first part being one or more physical devices of the shared data resource.

12. The method of claim 1, the shared data resource comprising at least one magnetic data storage disk.

13. The method of claim 1, the cache comprising random access memory.

14. The method of claim 1, further comprising the steps of:

detecting an error in operation of the shared data resource; and in response to the error detection, updating the fast path map to indicate absence of any data path between any of the hosts and the shared data resource.

15. The method of claim 1, further comprising the steps of:

detecting an error in operation of the cache; and in response to the error detection, updating the fast path map to indicate absence of any data path between any of the hosts and the cache.

16. The method of claim 1, further comprising the steps of:

detecting an error in operation of a second one of the multiple hosts; and in response to the error detection, updating the fast path map to indicate no establishment of any data path between (1) the second host and the cache, and (2) the second host and the shared data resource.

17. A method for operating a data storage subsystem having a shared data resource accessible by multiple hosts, said subsystem also including a cache coupled to the hosts and the shared data resource, comprising the steps of:

for each initial host request to exchange a first data block with the shared data resource, performing initial access steps comprising:

identifying a first part of the shared data resource containing the first data block;

establishing the first data path between the first host and the first part by performing steps comprising:

performing a parameter checking step including verifying validity of parameters accompanying the host request;

performing a resource checking step including verifying that the cache is operational;

if the host request constitutes a request to read the first data block from the shared data resource, determining whether the first data block is present in the cache, and if not present copying the first data block into the cache;

performing error recovery setup including configuring the data storage subsystem for recovery of any errors occurring during exchange of the first data block;

updating a fast path map to indicate establishment of the first data path between the first host and the first part; and transferring the first data block between the cache and the first host while locking at least the first part of the shared data resource;

for each subsequent host request to access any data block contained in the first part, performing subsequent access steps comprising:

utilizing the previously established first data path and the previously performed parameter verifying, resource verifying, and error recovery steps;

transferring the first data block by performing steps comprising:

if the request constitutes a request to read the first data block from the shared data resource, determining whether the first data block is present in the cache, and if so, transferring the first data block from the cache to the first host utilizing the first data path between the first host and the cache while leaving the shared data resource in an unlocked condition;

if the request constitutes a request to write the first data block from the first host to the shared data resource, transferring the first data block from the first host to the cache utilizing the first data path between the first host and the cache while leaving the shared data resource in an unlocked condition; and during transferring of the first data block marking in a directory an entry corresponding to the first data block to prevent access of the first data block by other hosts.

18. An article of manufacture comprising a data storage medium tangibly embodying a program of machine-readable instructions executable by a digital processing apparatus to perform method steps for facilitating streamlined data transfer operations in a data storage system, said method steps comprising:

receiving a request by a first one of the multiple hosts to exchange a first data block with the shared data resource, said request including specification of a number of data transfer parameters, said first data block residing in a first part of the shared data resource;

in response to the request, consulting a fast path map to determine whether a first data path has been established between the first host and the first part;

if the first data path has not been established, performing first path setup-transfer steps comprising:

establishing the first data path between the first host and the first part by performing steps comprising:

performing a parameter checking step including verifying validity of the data transfer parameters;

performing a resource checking step including verifying that the cache and the first part are operational;

if the request constitutes a request to read the first data block from the shared data resource, determining whether the first data block is present in the cache, and if not present copying the first data block into the cache;

performing an error recovery setup step including configuring the data storage system for recovery of any errors occurring during exchange of the first data block;

updating the fast path map to indicate establishment of the first data path between the first host and the first part; and transferring the first data block between the cache and the first host while locking at least the first part of the shared data resource;

if the first data path has already been established, performing accelerated access steps comprising:

utilizing the previously established first data path and the previously performed parameter verifying, resource verifying, and error recovery steps;

transferring the first data block by performing steps comprising:

if the request constitutes a request to read the first data block from the shared data resource, determining whether the first data block is present in the cache, and if so, transferring the first data block from the cache to the first host utilizing the first data path between the first host and the cache while leaving the shared data resource in an unlocked condition;

if the request constitutes a request to write the first data block from the first host to the shared data resource, transferring the first data block from the first host to the cache utilizing the first data path between the first host and the cache while leaving the shared data resource in an unlocked condition; and during transferring of the first data block marking in a directory an entry corresponding to the first data block to prevent access of the first data block by other hosts.

19. The article of manufacture of claim 18, wherein the data block is a track of data.

20. The article of manufacture of claim 18, wherein the data block comprises multiple tracks of data.

21. The article of manufacture of claim 18, further comprising the steps of:

during transferring of the first data block, locking the first data block to limit access to the first data block exclusively to the first host.

22. The article of manufacture of claim 21, the locking step comprising designating the first data block as being busy in a directory.

23. The article of manufacture of claim 18, the accelerated access steps further comprising the following steps, performed if the request constitutes a request to read the first data block from the shared data resource and the first data block is not present in the cache:

updating the fast path map to indicate absence of the first data path between the first host and the cache; and issuing an abort command and reporting failure of the data transfer operation to the first host.

24. The article of manufacture of claim 18, the accelerated access steps further comprising the following steps, performed if the request constitutes a request to read the first data block from the shared data resource, and the first data block is not present in the cache:

updating the fast path map to indicate no establishment of the first data path between the first host and the cache; and performing the first path setup-transfer steps.

25. The article of manufacture of claim 18, the accelerated access steps further comprising the following steps, performed if the request constitutes a request to read the first data block from the shared data resource but the first data block in the cache is presently being accessed by a different host:

updating the fast path map to indicate absence of the first data path between the first host and the cache; and issuing an abort command and reporting failure of the data transfer operation to the first host.

26. The article of manufacture of claim 18, the accelerated access steps further comprising the following steps, performed if the request constitutes a request to read the first data block from the shared data resource but the first data block in the cache is presently being accessed by a different host:

updating the fast path map to indicate no establishment of the first data path between the first host and the cache; and performing the first path setup-transfer steps.

27. The article of manufacture of claim 18, the first part being a logical subcomponent of the shared data resource.

28. The article of manufacture of claim 18, the first part being one or more physical devices of the shared data resource.

29. The article of manufacture of claim 18, the shared data resource comprising at least one magnetic data storage disk.

30. The article of manufacture of claim 18, the cache comprising random access memory.

31. The article of manufacture of claim 18, further comprising the steps of:

detecting an error in operation of the shared data resource; and in response to the error detection, updating the fast path map to indicate absence of any data path between any of the hosts and the shared data resource.

32. The article of manufacture of claim 18, further comprising the steps of:
   detecting an error in operation of the cache; and
   in response to the error detection, updating the fast path map to indicate absence of any data path between any of the hosts and the cache.

33. The article of manufacture of claim 18, further comprising the steps of:
   detecting an error in operation of a second one of the multiple hosts; and
   in response to the error detection, updating the fast path map to indicate no establishment of any data path between (1) the second host and the cache, and (2) the second host and the shared data resource.

34. An article of manufacture comprising a data storage medium tangibly embodying a program of machine-readable instructions executable by a digital processing apparatus to perform method steps for facilitating streamlined data transfer operations in a data storage subsystem having a shared data resource accessible by multiple hosts and also having a cache coupled to the hosts and the shared data resonance, said method steps comprising:
   for each initial host request to exchange a first data block with the shared data resource, performing initial access steps comprising:
      identifying a first part of the shared data resource containing the first data block;
      establishing the first data path between the first host and the first part by performing steps comprising:
         performing a parameter checking step including verifying validity of parameters accompanying the host request;
         performing a resource checking step including verifying that the cache is operational;
         if the host request constitutes a request to read the first data block from the shared data resource, determining whether the first data block is present in the cache, and if not present copying the first data block into the cache;
         performing error recovery setup including configuring the data storage subsystem for recovery of any errors occurring during exchange of the first data block;
         updating a fast path map to indicate establishment of the first data path between the first host and the first part; and
      transferring the first data block between the cache and the first host while locking at least the first part of the shared data resource;
   for each subsequent host request to access any data block contained in the first part, performing subsequent access steps comprising:
      utilizing the previously established first data path and the previously performed parameter verifying, resource verifying, and error recovery steps;
      transferring the first data block by performing steps comprising:
         if the request constitutes a request to read the first data block from the shared data resource, determining whether the first data block is present in the cache, and if so, transferring the first data block from the cache to the first host utilizing the first data path between the first host and the cache while leaving the shared data resource in an unlocked condition;
         if the request constitutes a request to write the first data block from the first host to the shared data resource, transferring the first data block from the first host to the cache utilizing the first data path between the first host and the cache while leaving the shared data resource in an unlocked condition; and
         during transferring of the first data block marking in a directory an entry corresponding to the first data block to prevent access of the first data block by other hosts.

35. A data storage system providing multiple hosts with streamlined access to cached data, comprising:
   a shared data resource;
   at least one storage director coupled to the shared data resource, comprising:
      multiple channels to exchange data with multiple hosts;
      a cache memory;
      a shared control array, including a fast path map;
      a processor, coupled to the channels, cache memory, and shared control array, said processor being programmed to perform steps comprising:
         receiving a request by a first one of the multiple hosts to exchange a first data block with the shared data resource, said request including specification of a number of data transfer parameters, said first data block residing in a first part of the shared data resource;
   in response to the request, consulting a fast path map to determine whether a first data path has been established between the first host and the first part;
   if the first data path has not been established, performing first path setup-transfer steps comprising:
      establishing the first data path between the first host and the first part by performing steps comprising:
         performing a parameter checking step including verifying validity of the data transfer parameters;
         performing a resource checking step including verifying that the cache and the first part are operational;
         if the request constitutes a request to read the first data block from the shared data resource, determining whether the first data block is present in the cache, and if not present copying the first data block into the cache;
         performing an error recovery setup step including configuring the data storage system for recovery of any errors occurring during exchange of the first data block;
         updating the fast path map to indicate establishment of the first data path between the first host and the first part; and
      transferring the first data block between the cache and the first host while locking at least the first part of the shared data resource;
   if the first data path has already been established, performing accelerated access steps comprising:
      utilizing the previously established first data path and the previously performed parameter verifying, resource verifying, and error recovery steps;
      transferring the first data block by performing steps comprising:
         if the request constitutes a request to read the first data block from the shared data resource, determining whether the first data block is present in the cache, and if so, transferring the first data block from the cache to the first host utilizing the first data path between the first host and the cache while leaving the shared data resource in an unlocked condition;

if the request constitutes a request to write the first data block from the first host to the shared data resource, transferring the first data block from the first host to the cache utilizing the first data path between the first host and the cache while leaving the shared data resource in an unlocked condition; and during transferring of the first data block marking in a directory an entry corresponding to the first data block to prevent access of the first data block by other hosts.

36. The system of claim 35, the shared data resource including at least one magnetic data storage disk drive.

37. The system of claim 35, the cache comprising random access memory.

38. The system of claim 35, wherein the data block is a track of data.

39. The system of claim 35, wherein the data block comprises multiple tracks of data.

40. The system of claim 35, further comprising the steps of:

during transferring of the first data block, locking the first data block to limit access to the first data block exclusively to the first host.

41. The system of claim 38, the locking step comprising designating the first data block as being busy in a directory.

42. The system of claim 35, the accelerated access steps further comprising the following steps, performed if the request constitutes a request to read the first data block from the shared data resource and the first data block is not present in the cache:

updating the fast path map to indicate absence of the first data path between the first host and the cache; and issuing an abort command and reporting failure of the data transfer operation to the first host.

43. The system of claim 35, the accelerated access steps further comprising the following steps, performed if the request constitutes a request to read the first data block from the shared data resource, and the first data block is not present in the cache:

updating the fast path map to indicate no establishment of the first data path between the first host and the cache; and performing the first path setup-transfer steps.

44. The system of claim 35, the accelerated access steps further comprising the following steps, performed if the request constitutes a request to read the first data block from the shared data resource but the first data block in the cache is presently being accessed by a different host:

updating the fast path map to indicate absence of the first data path between the first host and the cache; and issuing an abort command and reporting failure of the data transfer operation to the first host.

45. The system of claim 35, the accelerated access steps further comprising the following steps, performed if the request constitutes a request to read the first data block from the shared data resource but the first data block in the cache is presently being accessed by a different host:

updating the fast path map to indicate no establishment of the first data path between the first host and the cache; and performing the first path setup-transfer steps.

46. The system of claim 35, the first part being a logical subcomponent of the shared data resource.

47. The system of claim 35, the first part being one or more physical devices of the shared data resource.

48. The system of claim 35, the shared data resource comprising at least one magnetic data storage disk.

49. The system of claim 35, the cache comprising random access memory.

50. The system of claim 35, further comprising the steps of:

detecting an error in operation of the shared data resource; and in response to the error condition, updating the fast path map to indicate absence of any data path between any of the hosts and the shared data resource.

51. The system of claim 35, further comprising the steps of:

detecting an error in operation of the cache; and in response to the error condition, updating the fast path map to indicate absence of any data path between any of the hosts and the cache.

52. The system of claim 35, further comprising the steps of:

detecting an error in operation of a second one of the multiple hosts; and in response to the error condition, updating the fast path map to indicate no establishment of any data path between (1) the second host and the cache, and (2) the second host and the shared data resource.

53. A data storage system providing multiple hosts with streamlined access to cached data, comprising:

a shared data resource;

at least one storage director coupled to the shared data resource, comprising:

multiple channels to exchange data with multiple hosts;

a cache memory;

a shared control array, including a fast path map;

a processor, coupled to the channels, cache memory, and shared control array, said processor being programmed to perform steps comprising:

for each initial host request to exchange a first data block with the shared data resource, performing initial access steps comprising:

identifying a first part of the shared data resource containing the first data block;

establishing the first data path between the first host and the first part by performing steps comprising:

performing a parameter checking step including verifying validity of parameters accompanying the host request;

performing a resource checking step including verifying that the cache is operational;

if the host request constitutes a request to read the first data block from the shared data resource, determining whether the first data block is present in the cache, and if not present copying the first data block into the cache;

performing error recovery setup including configuring the data storage subsystem for recovery of any errors occurring during exchange of the first data block;

updating a fast path map to indicate establishment of the first data path between the first host and the first part; and transferring the first data block between the cache and the first host while locking at least the first part of the shared data resource;

for each subsequent host request to access any data block contained in the first part, performing subsequent access steps comprising:
    utilizing the previously established first data path and the previously performed parameter verifying, resource verifying, and error recovery steps;
    transferring the first data block by performing steps comprising:
        if the request constitutes a request to read the first data block from the shared data resource, determining whether the first data block is present in the cache, and if so, transferring the first data block from the cache to the first host utilizing the first data path between the first host and the cache while leaving the shared data resource in an unlocked condition;
        if the request constitutes a request to write the first data block from the first host to the shared data resource, transferring the first data block from the first host to the cache utilizing the first data path between the first host and the cache while leaving the shared data resource in an unlocked condition; and
        during transferring of the first data block marking in a directory an entry corresponding to the first data block to prevent access of the first data block by other hosts.

* * * * *